United States Patent [19]

Kanamaru

[11] Patent Number: 4,680,744
[45] Date of Patent: Jul. 14, 1987

[54] DISC PLAYER HAVING PICK-UP TILT SERVO SYSTEM COMBINED WITH DISC PRESENCE DETECTION CIRCUITS

[75] Inventor: Hitoshi Kanamaru, Tokorozawa, Japan

[73] Assignee: Pioneer Electronic Corporation, Tokyo, Japan

[21] Appl. No.: 696,191

[22] Filed: Jan. 29, 1985

[30] Foreign Application Priority Data

Jan. 30, 1984 [JP] Japan ............ 59-012144[U]

[51] Int. Cl.$^4$ .............................. G11B 7/00
[52] U.S. Cl. ........................ 369/44; 369/46; 369/58
[58] Field of Search ................ 369/43–46, 369/54–58, 79; 250/201 DF, 202

[56] References Cited

U.S. PATENT DOCUMENTS

| | | | |
|---|---|---|---|
| 4,032,971 | 6/1977 | Camerik | 369/79 |
| 4,239,942 | 12/1980 | Van Alen et al. | 369/43 |
| 4,340,950 | 7/1982 | Kosaka | 369/44 |
| 4,499,571 | 2/1985 | Yokota | 369/58 |
| 4,541,084 | 9/1985 | Oku et al. | 369/45 |
| 4,574,372 | 3/1986 | d'Alayer de Costemore d'Arc | 369/79 |

FOREIGN PATENT DOCUMENTS

| | | | |
|---|---|---|---|
| 0038663 | 3/1980 | Japan | 369/54 |
| 0179954 | 11/1982 | Japan | 369/54 |

Primary Examiner—Raymond F. Cardillo
Assistant Examiner—Robert A. Weinhardt
Attorney, Agent, or Firm—Fleit, Jacobson, Cohn & Price

[57] ABSTRACT

A recorded data playback apparatus for reproduction of data from recording discs, of the type in which a light beam (e.g. from a laser) is used in performing data readout from the disc, is provided with a servo system for detecting and correcting any deviations from a mutually perpendicular relationship between the axis of the data sensing light beam and the surface of the recording disc on which the light beam is incident, by varying a degree of tilt of that light beam, and a device for sensing the presence or absence of a recording disc mounted on the apparatus and for opening the servo loop when it is detected that no disc is present. When this is done, the tilt control device of the servo system becomes held in the condition which existed immediately prior to the absence of a recording disc being detected, thereby preventing servo loop runaway.

4 Claims, 2 Drawing Figures

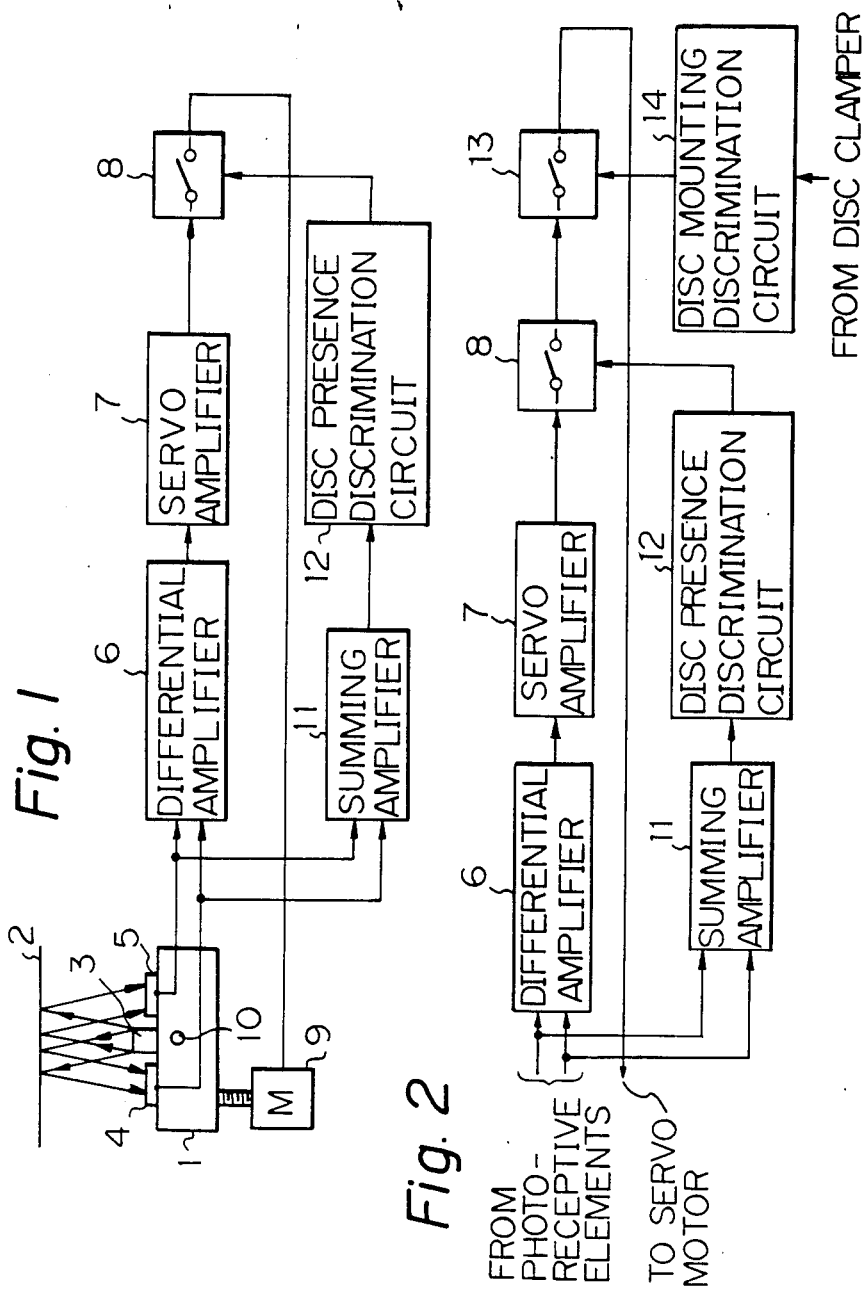

DISC PLAYER HAVING PICK-UP TILT SERVO SYSTEM COMBINED WITH DISC PRESENCE DETECTION CIRCUITS

BACKGROUND OF THE DISCLOSURE

The present invention relates to a recorded data playback apparatus for reproduction of data from a recording disc by photo-electric sensing means, e.g. of the type in which a light beam such as a laser light beam is directed onto recording tracks of the disc and the resultant reflected light is sensed. With such an apparatus, it is necessary that this data sensing light beam be held precisely positioned with respect to the recording tracks, i.e. that the light beam precisely follows a single recording track. This is because, if any light from the data sensing light beam should fall upon an adjacent recording track, then the resultant reflected light will be sensed and will produce crosstalk. It is therefore necessary to maintain a precisely mutually perpendicular relationship between the data sensing light beam and the recording disc surface. This is generally accomplished by utilizing a servo system, sometimes referred to as a tilt servo system, which is coupled to the pick-up of the apparatus and acts to detect and compensate for any deviations from an accurate mutually perpendicular relationship between the data sensing light beam and the recording disc. sensing means mounted on the pick-up (i.e. the unit which emits the data sensing light beam and receives and transduces the resultant reflected light from the recording disc into a data signal) of the recorded data playback apparatus for detecting a deviation from the mutually perpendicular relationship, producing a signal which varies in accordance with such a deviation, a servo amplifier which receives the latter signal, and a servo motor which is driven by an output signal from the servo amplifier and is coupled to the pick-up and acts to move the pick-up such as to vary the degree of tilt of the data sensing light beam with respect to the surface plane of the recording disc such as to compensate for the deviation from the mutually perpendicular relationship between the data sensing light beam and the recording disc surface. The photo-sensing means referred to above generally comprise a photo-emissive element for directing light towards the recording disc surface, and photo-receptive elements which are positioned such as to detect light reflected from the recording disc surface resulting from that emitted by the latter photo-emissive element and to thereby produce output signals whose relationship varies in accordance with the degree of deviation from the mutually perpendicular relationship of the data sensing light beam and the recording disc. These output signals are sensed by means (e.g. a differential amplifier) which drive the servo amplifier.

Such a tilt servo system can provide very accurate maintenance of the mutually perpendicular relationship between the data sensing light beam and the recording disc. However if the recorded data playback apparatus is set in operation with no recording disc mounted on the turntable of the apparatus, or if a recording disc is removed from the apparatus while it is in operation, then the amount of light which is reflected back to the photo-receptive elements of the tilt servo system will fall considerably from that reflected when a recording disc is mounted. As a result, the "tracking lock" servo loop status will be lost, and runaway of the tilt servo system may result. This is a serious problem with prior art types of tilt servo system applied to such a recording disc playback apparatus.

SUMMARY OF THE DISCLOSURE

A recorded data playback apparatus according to the present invention essentially comprises a tilt servo system for detecting and compensating deviations from a mutually perpendicular relationship between a data sensing light beam and a recording disc by controlling the degree of tilt of said data sensing light beam relative to a perpendicular condition, means for detecting whether or not a recording disc is mounted on the apparatus and for providing a signal indicative thereof, and switch means responsive to the latter signal for rendering the tilt servo system inoperative when it is detected that no recording disc is mounted on the apparatus, while leaving the condition of the tilt servo system and hence the degree of tilt of said data sensing light beam fixed at that which existed immediately prior to the tilt servo system being rendered inoperative. In this way, runaway of the tilt servo system will not occur, when a recording disc is removed from the apparatus, and the "tracking lock" condition of the tilt servo system can be rapidly re-established when a recording disc is mounted on the apparatus.

A recorded data playback apparatus according to the present invention may further comprise switch means controlled by means for sensing that the recording disc is securely mounted on the apparatus, the latter switch means acting to render the tilt servo system inoperative when a recording disc is mounted but is not correctly secured on the apparatus.

BRIEF DESCRIPTION OF THE DRAWINGS

FIG. 1 is a general block diagram of an embodiment of a recorded data playback apparatus according to the present invention; and FIG. 2 is a block diagram of another embodiment of the present invention, which is a modification of that shown in FIG. 1.

DESCRIPTION OF THE PREFERRED EMBODIMENTS

FIG. 1 is a general block diagram of an embodiment of a recorded data playback apparatus according to the present invention, showing only those portions of the apparatus which constitute the invention. Numeral 1 denotes the pick-up of the apparatus, on which are mounted means for emitting a data sensing light beam used to read out data from the recording tracks of a disc 2. For simplicity of description, the data sensing light beam and the emission means therefor are omitted from the drawings. A photo-emissive element 3 is mounted on pick-up 1, while two photo-receptive elements 4 and 5 are mounted on pick-up 1 on either side of photo-emissive element 3, so that light which is emitted from photo-emissive element 3 and reflected from recording disc 2 becomes incident on both photo-receptive element 4 and photo-receptive element 5, as illustrated in FIG. 1. The resultant output signals from photo-receptive elements 4 and 5 are input to a differential amplifier 6. The resultant output signal from differential amplifier 6, which varies in accordance with any difference in amplitudes between the output signals from photo-receptive elements 4 and 5, is input to a servo amplifier 7. A servo signal is thereby output from servo amplifier 7, which is transferred through a loop switch 8, to drive a servo motor 9. Pick-up 1 is rotatably mounted (by means not shown in the drawings) for rotation about an axis 10. Servo motor 9 is coupled to rotate pick-up 1 about axis 10, to thereby control the degree of tilt of the data sensing light beam axis.

The output signals from photo-receptive elements 4 and 5 are also applied to input terminals of a summing amplifier 11, and a sum signal is thereby produced from amplifier 11 which varies in accordance with the sum of the amplitudes of the output signals from photo-receptive elements 4 and 5, i.e. in accordance with the total amount of reflected light which falls on photo-receptive elements 4 and 5. This sum signal is input to a disc presence discrimination circuit 12. This can comprise a level discrimination circuit, which produces an output signal at a first level when the sum signal from summing amplifier circuit 11 is above a predetermined level (when the amount of light reflected onto photo-receptive elements 4 and 5 indicates that a recording disc is mounted on the apparatus) and produces an output signal at a second level when the sum signal from summing amplifier circuit 11 is below that predetermined level (when the amount of light reflected onto photo-receptive elements 4 and 5 indicates that no recording disc is mounted on the apparatus). The output signal from disc presence discrimination circuit 12 is applied to control the open/closed state of loop switch 8, to thereby set the tilt servo loop in the inoperative and operative states respectively.

If for some reason the data sensing light beam becomes tilted away from a perpendicular relationship with the light beam axis, then since this is due to rotation of pick-up 1 about axis 10, a corresponding difference will be produced between the amplitudes of output signals from photo-receptive elements 4 and 5. Thus, the output signal from differential amplifier 6 will vary in accordance with the amount of this deviation from a mutually perpendicularly intersecting relationship between the light beam axis and the recording disc. A corresponding level of servo signal will thereby be output from servo amplifier 7, and transferred through loop switch 8 to produce rotation of motor 9, in a direction such as to reduce the level of the servo signal and hence the amount of deviation from the mutually perpendicular relationship. In this way, the tilt servo system acts to maintain the mutually perpendicular relationship.

If there is no recording disc mounted on the apparatus, then no substantial proportion of the light which is produced by photo-emissive element 3 will be reflected back towards photo-receptive elements 4 and 5. Thus, the output signal from summing amplifier 11 will be extremely small in amplitude. As a result, a signal will be output from disc presence discrimination circuit 12 which will act to open loop switch 8. The servo loop is thereby opened. Since no further rotation of pick-up 1 about axis 10 can take place in this condition, since the pick-up will be held in position by motor 9, the system (and the degree of tilt of the data sensing light beam) will be left in the status which existed immediately prior to the loop being opened. In this way, runaway of the servo system is prevented, when no recording disc is mounted on the apparatus.

FIG. 2 is a block circuit diagram of another embodiment of the present invention. This is a modification of the embodiment of FIG. 1, and component blocks in FIG. 2 which are identical to those in the embodiment of FIG. 1 are indicated by corresponding reference numerals. For simplicity of description, motor 9 and pick-up 1 are omitted from FIG. 2. The embodiment of FIG. 2 differs from that of FIG. 1 in that a second loop switch 13 is provided in addition to loop switch 8. Switch 13 is controlled by an output signal from a disc mounting discrimination sensor 14, which receives as input signal a clamp signal that is produced by the disc clamper of the recorded data playback apparatus. The disc clamper is a portion of the apparatus which serves to securely retain a recording disc in a predetermined position on the apparatus, such as to ensure a correct positional relationship between the data sensing light beam and the recording tracks of the disc. In this embodiment, when the recording disc is securely clamped in position on the apparatus by the disc clamper, then a signal is output from the clamper at a predetermined level, to indicate that this condition has been established, while this signal is otherwise held at a different level, indicating that the disc is not securely mounted. This signal from the disc clamper is input to the disc mounting discrimination sensor 14. When the output signal from the disc clamper is at the level which indicates that the disc is not securely clamped, then a corresponding output signal is produced from sensor 14, which acts to hold switch 13 in the open state. The tilt servo system is thereby held in the inoperative state, even if loop switch 8 is closed. Thus, the tilt condition which existed prior to the servo loop being opened will be held unchanged. If the output signal from the disc clamper indicates that a recording disc is securely mounted on the apparatus, then a corresponding output signal is produced from disc mounting discrimination circuit 14 which acts to close loop switch 8, to thereby set the tilt servo system in the operative state.

It will be apparent that in some cases it may be possible to apply the signal from the disc clamper directly to loop switch 13, to control the open/closed state thereof, or to apply the output from summing amplifier 11 directly to control the operation of loop switch 8, In addition, various other signals may be utilized as indicating that a recording disc is securely mounted on the apparatus and that playing of the disc is ready to begin. These include, for example, a command signal designating that playback of a disc is to begin, a command signal designating that rotation of the turntable is to begin, etc. Conversely, a "disc eject" command signal can be utilized to set loop switch 13 in the open state, to thereby render the tilt servo system inoperative immediately prior to removal of a recording disc from the apparatus.

Thus, although the present invention has been described in the above with reference to specific embodiments, various changes and modifications to the embodiments may be envisaged, which fall within the scope claimed for the invention as set out in the appended claims. The above specification should therefore be interpreted in a descriptive and not in a limiting sense.

What is claimed is

1. A recorded data playback apparatus for reproduction of data from a recording disc, comprising:
   a pick-up including first light-emitting means for emitting a data sensing light beam for read-out of data from said recording disc;
   a tilt servo system including a second light-emitting element mounted on said pick-up for emitting a tilt detection light beam towards said recording disc, at least two photo-receptive elements mounted on said pick-up to receive light reflected from said recording disc resulting from said second light-emitting element emission, a differential amplifier circuit connected to said photo-receptive elements for receiving output signals from said photo-receptive elements so as to produce an error signal varying in accordance with any difference in intensity between the output signals from said photo-receptive elements, and drive means for positioning said pick-up in accordance with said error signal so as to reduce the magnitude of said error signal;

disk presence discrimination means for producing a first output signal selectively indicating the presence and a second output signal indicating absence of said recording disc in accordance with the magnitude of at least one of the output signals from said photo-receptive elements; and loop switch means coupled in said tilt servo system and controlled by said disc presence discrimination means, for thereby setting said tilt servo system in an operative state, in response to said first output signal and, for thereby setting said tilt servo system in an inoperative state in response to said second output signal.

2. A recorded data playback apparatus according to claim 1, in which said disc presence discrimination means comprises summing circuit means coupled to receive said output signals from said photo-receptive elements for producing as output a sum signal which varies in accordance with the sum of said output signals, and level discrimination circuit means coupled to receive said sum signal, for producing said first output signal when said sum signal is above a predetermined level indicative that a recording disc is mounted on said recorded data playback apparatus, and for producing said second output signal when said sum signal is below said predetermined level.

3. A recorded data playback apparatus according to claim 1, in which said recorded data playback apparatus comprises disc clamp detection means for generating a disc clamp detection and indication signal indicative that said recording disc is securely mounted on said apparatus in a predetermined manner, and disc mounting discrimination means controlled in accordance with said indication signal for controlling said loop switch means such as to set said tilt servo system in an inoperative condition unless said disc clamp detection means produce said disc clamp detection and indication signal and said indication signal indicates that said recording disc is securely mounted on said apparatus, and such as to set said tilt servo system in an operative condition when said indication signal indicates that said recording disc is securely mounted on said apparatus.

4. A recorded data playback apparatus according to claim 3, in which said loop switch means includes a first loop switch responsive to said disc presence discrimination means, which becomes conductive in response to said first output signal from said disc presence discrimination means while keeping a non-conductive state in response to said second output signal, and a second loop switch responsive to said disc clamp detection and indication signal which becomes conductive in response to said disc clamp detection and indication signal, said first and second loop switches being so connected with said tilt servo system that said error signal is interrupted to said drive means when either one of said first and second switches is non-conductive.

* * * * *